March 13, 1962    J. H. EBY, JR    3,024,774
TUNED INTAKE MANIFOLD
Filed Feb. 5, 1959    5 Sheets-Sheet 1

Inventor:
John H. Eby, Jr.
Paul O. Pippel Atty.

March 13, 1962   J. H. EBY, JR   3,024,774
TUNED INTAKE MANIFOLD
Filed Feb. 5, 1959   5 Sheets-Sheet 2
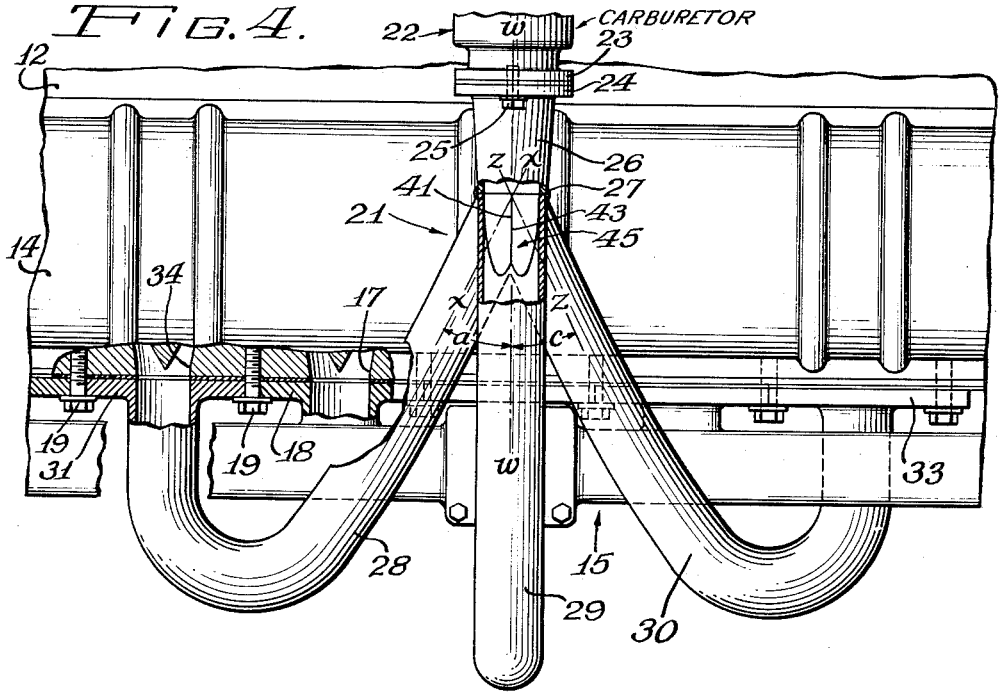
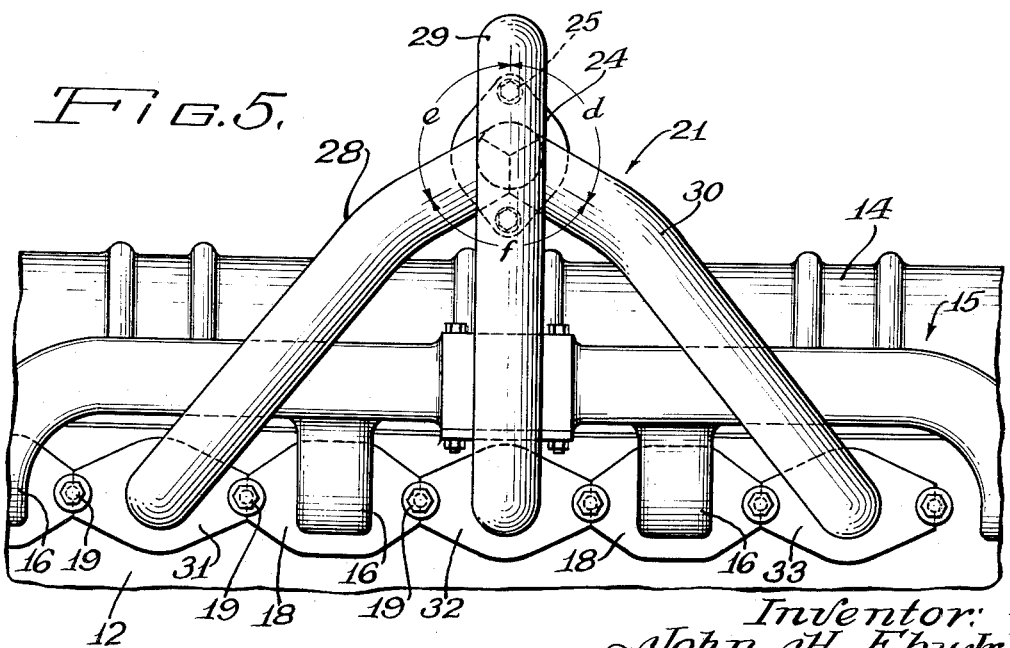
Inventor:
John H. Eby, Jr.

March 13, 1962 J. H. EBY, JR 3,024,774
TUNED INTAKE MANIFOLD
Filed Feb. 5, 1959 5 Sheets-Sheet 3

Inventor:
John H. Eby, Jr.
Paul O. Pippel
Atty.

March 13, 1962 J. H. EBY, JR 3,024,774
TUNED INTAKE MANIFOLD
Filed Feb. 5, 1959 5 Sheets-Sheet 4
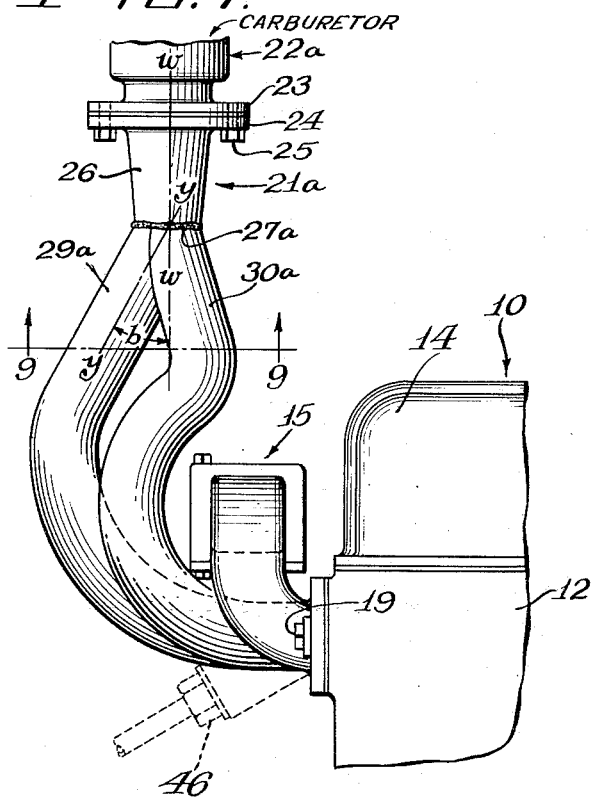
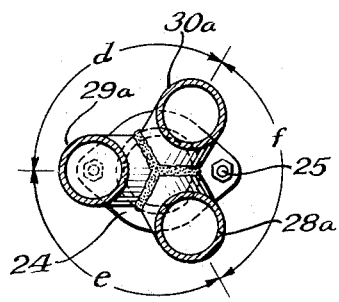
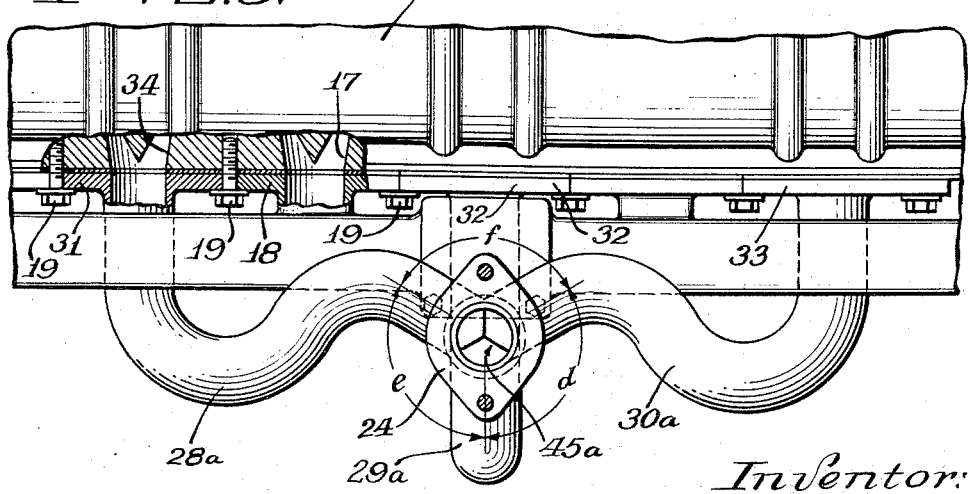
Inventor:
John H. Eby Jr.
Paul O. Ripper
Attys.

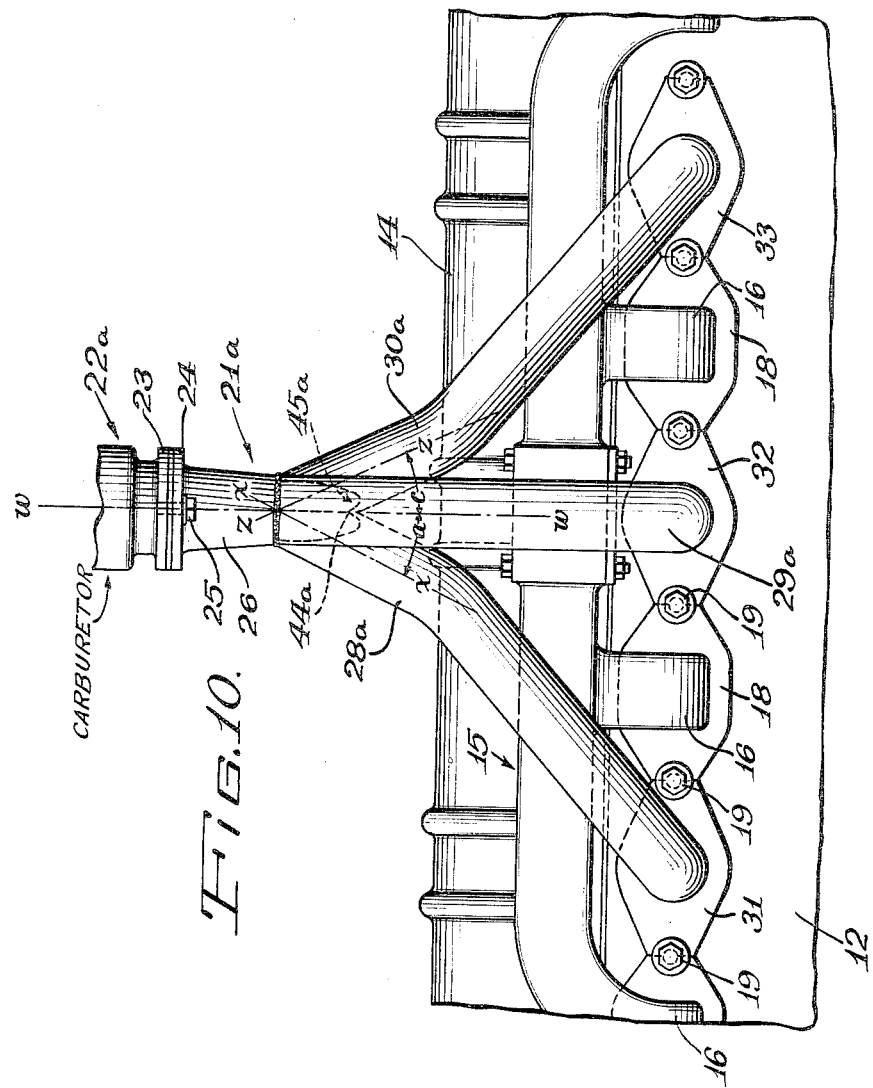

# United States Patent Office 3,024,774
Patented Mar. 13, 1962

3,024,774
TUNED INTAKE MANIFOLD
John Howard Eby, Jr., Naperville, Ill., assignor to International Harvester Company, Chicago, Ill., a corporation of New Jersey
Filed Feb. 5, 1959, Ser. No. 791,455
5 Claims. (Cl. 123—52)

This invention relates generally to induction means for internal combustion engines but, more particularly it is concerned with a dynamically tuned intake manifold adapted to provide increased power when used with a multiple cylinder naturally aspirated internal combustion engine of the reciprocating piston type.

It is widely known in the automotive industry that improved power output and fuel economy can be achieved by dynamically super-charging an internal combustion engine and, heretofore, attempts have been made to fashion induction systems that would accomplish this objective. One of the means proposed for attaining such objective was that of the tuned or ram-pipe type of intake manifold wherein, as is well understood, the resulting phenomenon produced is basically similar to that of the hydraulic ram or water-hammer, such as occurs when a water faucet at the end of a long pipe is closed rapidly. Although a variety of so-called ram-type intake manifolds have previously been proposed and used, with some degree of success, in association with fuel injection systems for internal combustion engines, it has heretofore been believed, by some qualified technicians in the field, that the conventional manifold layout, comprising one carburetor and multi-off-take stubs or branches, could not make use of the tuning principle, because the pressure pulses from one port of the engine would interfere with an attenuate those from neighboring ports thereof. Nevertheless some prior designs of comparable intake manifolds adaptable for multiple-cylinder, single carbureted engines have been proposed and, having been generally compromised because of space limitations and the necessity for obtaining good fuel distribution, have met with only limited success in the industry. However, induction systems featuring some degree of dynamic tuning without sacrificing effective fuel distribution, have, on the other hand, been attained, on occasion, by the use of multiple carburetion. The complexity and cost of the latter systems, however, does not encourage their ready acceptance by the industry. Furthermore, the manifolds used currently on many quantity-produced engines are believed to be unsatisfactory for tuning because of the complex shape thereof and because the design thereof is such that interference between one port and another is unavoidable.

Some of the previously proposed tuned manifold structures while readily adaptable for use with fuel injection systems were not altogether satisfactory for use with naturally aspirated carbureted engines, hence their employment was limited to the specific application for which they were designed and thus their flexibility was, accordingly, limited. The inability to satisfactorily adapt and use such structures with carbureted engines stems from a variety of reasons, one of which is probably the employment of plenum chambers, or the like, in the manifold thereof, wherein at low velocities vaporized fuel tends to fall out or settle onto the bottom of said chamber, and, since there are usually high and low velocity areas within the plenum chamber, in such an arrangement, the fuel generally has a tendency to settle out into the low velocity area and, also, to run along the walls of the chamber. Frequently, too, in such systems excess turbulence is created during distribution of the mixture whereas, as is well known, since turbulence in such charge decreases volumetric efficiency, it should be maintained at a minimum until the charge reaches the combustion chamber of the engine's cylinders. The result of such fuel separation and charging mixture disturbances is, of course, poor fuel distribution and, concomitant therewith, poor fuel economy with the ultimate result of something less than maximum performance for the engine. In addition, it has not always been practicable to obtain the balance necessary between length and diameter of the individual manifold off-take branches required to effect tuning, as is well understood, at a plurality of engine speeds.

It is a primary feature of the present invention, therefore, to provide a fuel induction system, incorporating a tuned intake manifold therein, which effectively overcomes the disadvantages and drawbacks, heretofore enumerated, incident to such systems when employed in association with a quantity-produced internal combustion engine.

An important object of the present invention is to provide an intake manifold that utilizes the dynamic supercharging provided by ram tubes, while maintaining substantially optimum fuel distribution, for increasing the power output and improving the fuel economy of an internal combustion engine.

Another important object is to provide an intake manifold of such construction and configuration that the branches or stubs thereof operate as ram-type tubes, while maintaining substantially optimum fuel distribution, for increasing the power output and improving the fuel economy of a naturally aspirated spark ignition internal combustion engine utilizing a single barrel carburetor or throttle control therewith.

A further object is to provide an intake manifold having a common fuel charge inlet tube from which branches of substantially equal length and volumetric capacity divergingly extend and are adapted for connection with a plurality of inlet ports in an internal combustion engine.

A further important object is to provide an intake manifold having a common fuel charge inlet header portion and a plurality of branch tubes of substantially equal length that connect with one end of said common header portion and diverge outwardly therefrom at substantially equal angles to the axis of fuel flow within said common header portion.

A still further object is to provide a tuned intake manifold wherein a common header portion opens into a plurality of branches each of which diverges or extends outwardly from said common header at an angle acute to a projection when extended of the axis of fuel flow in said common header portion, when measured in a direction away from the entrance of fuel therein, and wherein each such branch is adapted for connection to a different cylinder inlet port in an internal combustion engine.

A yet still further object is to provide an intake manifold or duct system for an internal combustion engine having various induction passages formed therein and wherein each such passage is of a predetermined length and diameter suitable for providing the ram effect resulting from dynamic tuning even though the rotational speed of said engine is comparatively low.

Another specific object is to provide an intake manifold having a common fuel charge inlet tube connected with branches of substantially equal length and volumetric capacity which divergingly extend endwise therefrom and are adapted for connection with a plurality of inlet ports in an internal combustion engine, and wherein means defining a flow divider disposed in the path of fluid flow in said manifold operates to direct fluid flow from said common tube equally into each of the connected brances.

The foregoing and other objects and advantages are attained by the present invention, various novel features of which will be apparent from the description herein and the accompanying drawings disclosing several embodiments of the invention, and will be more particularly pointed out in the appended claims.

FIG. 4 is a top plan view of the proposed manifold and shown with portions thereof and of the associated fragmentarily depicted engine cut-away to better illustrate certain structural details;

FIG. 5 is a front elevational view of the manifold of the present invention;

FIG. 7 is a side elevational view similar to FIG. 2, but showing a modified form of the proposed manifold;

FIG. 8 is a top plan view similar to FIG. 4, showing the modified manifold construction without the carburetor in position;

FIG. 9 is a vertical sectional view taken on line 9—9 of FIG. 7; and

FIG. 10 is a front elevational view similar to FIG. 5, and showing the modified manifold.

Figure 1:
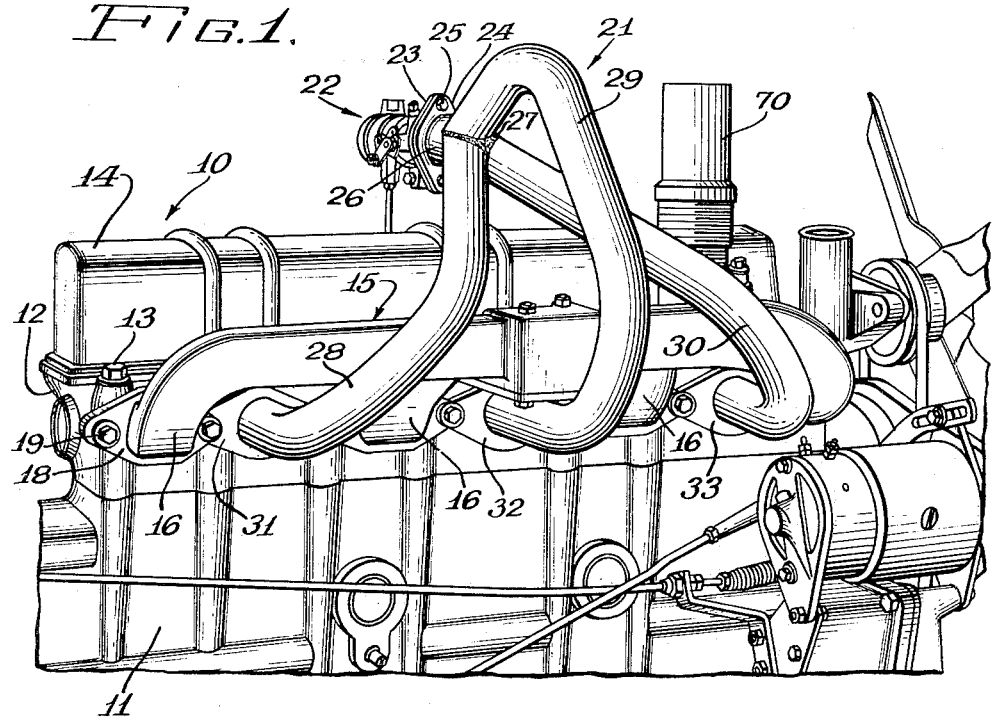
FIG. 1 is a perspective view of a manifold constructed according to the invention and shown as employed with an internal combustion engine, portions only of which engine are illustrated.

Referring now to the drawings, where there is depicted one preferred form of the present invention, it will be noted that the proposed induction system is shown as being utilized with a naturally aspirated spark ignition six-cylinder internal combustion engine having a single barrel carburetor employed therewith. It should be understood, however, that the invention is not limited to the specific engine application and equipment illustrated, since it is susceptible of other more general uses and applications.

A generally conventional internal combustion engine, indicated generally by the reference numeral 10, and adapted for suitable mounting on a supporting structure by well known means (not shown), includes a cylinder block 11, a cylinder head 12 suitably mounted thereon and secured by the bolts 13, and a cover 14, fastened to said head by suitable securing means (not shown). An exhaust manifold 15, having branches such as shown at 16 and connectable one each to an outlet port opening 17 in the cylinder head 12, is secured in conventional fashion by flanges 18 and bolts 19 to said head, while an exhaust outlet or discharge pipe 20 extending therefrom may be connected to a muffler (not shown) as is well understood. The port openings 17, as illustrated, are of the conventional "Siamese" type wherein one opening in the cylinder head serves two cylinder exhaust valve openings or ports and, since the structure of such ports is so well known, it was felt any more detailed illustration or description thereof would serve no particularly useful purpose in helping to understand the present invention.

The proposed intake manifold, fashioned in accordance with the more specific teachings of the present invention, and indicated generally by the reference numeral 21, has been shown (in FIGS. 1–5) as being used with a conventional horizontally disposed carburetor of a well known type which is indicated in its entirety by the reference numeral 22. It will be appreciated, however, that the proposed invention is also envisaged for use with various other types of carburetors and throttling devices, such for instance as the Up-Draft and Down-Draft types of carburetors and fuel injection systems; but for purposes of illustrating one preferred form of application of the inventive concepts hereof, the particular horizontally arranged carburetor unit shown was selected. The inlet of the carburetor 22 may be suitably connected to an air inlet (not shown) of the engine as is well understood, while the outlet of the carburetor, having a mounting flange 23 fastened therearound, is disposed in abutting relation with a similar mounting flange 24 on manifold 21 and the respective flanges may be connected together by suitable bolt means 25.

The manifold 21, which may also be looked upon as a duct system, preferably, is fashioned with a common tube or header-like inlet conduit portion 26, also referred to as a primary duct, having the flange 24 fixedly secured to the inlet end thereof, while the opposite or outlet end of said common primary duct opens into a plurality of branch tubes or ram-pipes, also termed as secondary ducts, leading endwise therefrom and indicated by the reference numerals 28, 29 and 30. The common tube or primary duct 26 may be connected to said branch tubes or secondary ducts and said branches to one another by any suitable or well known means such, for instance, as by welding or brazing, but, as illustrated herein, said branches have been secured by the welds indicated at 27. It will be understood, however, that the means for securing such ducts together should not be a limitation as it is also envisaged by the present invention that the primary duct or common tube may be integrally formed, as by casting or the like, with said branch tubes or secondary ducts without deviating from any of the teachings hereof.

The common tube or header-like conduit portion 26, as illustrated, is fashioned, preferably, so that the interior walls of said conduit may provide a small longitudinal axial taper or convergency extending from the inlet to the outlet thereof. The interior diameter of said conduit, at the point of its initial junction with the branch tubes 28, 29 and 30, preferably, should be substantially the same as the individual interior diameters of the branches diverging or extending theerfrom. The length of the common tube or primary header 26 may vary according to the physical characteristics of the engine with which it is to be associated. It has been found, however, that for purposes of this invention such length may vary from a minimum of 1" to a maximum of 14" without appreciably or significantly affecting dynamic tuning (the ram effect) or interfering with the improved operating characteristics resulting from the use of this manifold or duct system.

The branch tubes or secondary ducts 28, 29 and 30, are also provided with mounting flanges, such as 31, 32 and 33 on the opposite or outlet ends of said respective tubes and each such branch or secondary duct is adapted for communication with an associated inlet port, such as one of the "Siamese" ports indicated at 34, in the cylinder head 12, while said flanges may be suitably secured to said head by conventional means such as the bolts 19.

Figures 2, 3:
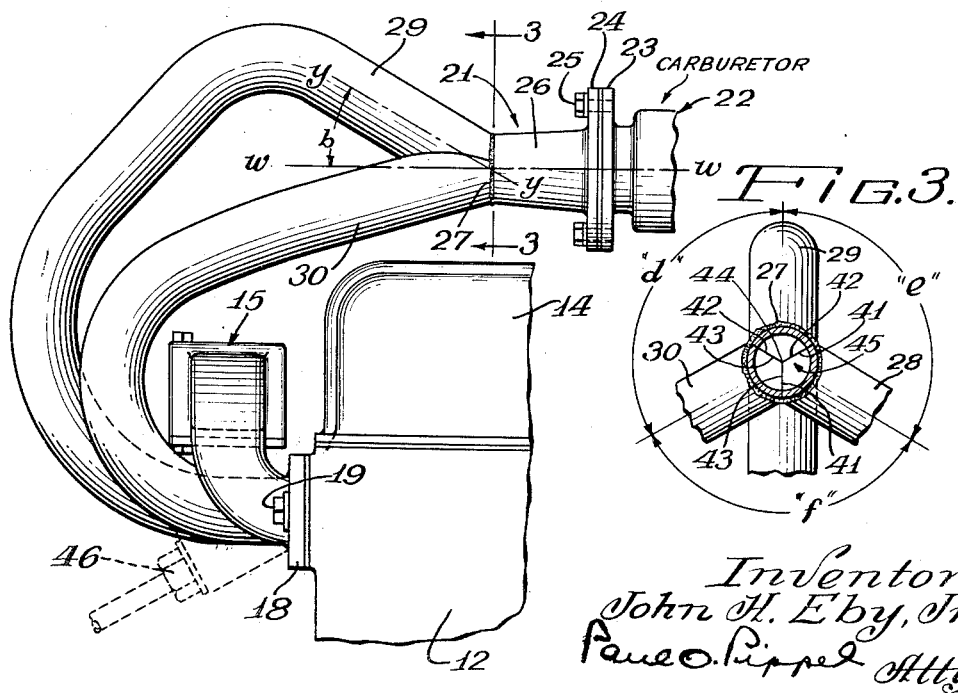
FIG. 2 is a side elevational view of the proposed manifold.
FIG. 3 is a vertical sectional view taken on line 3—3 of FIG. 2 and shows the baffle-like flow dividing means formed in the manifold.
Figure 6:
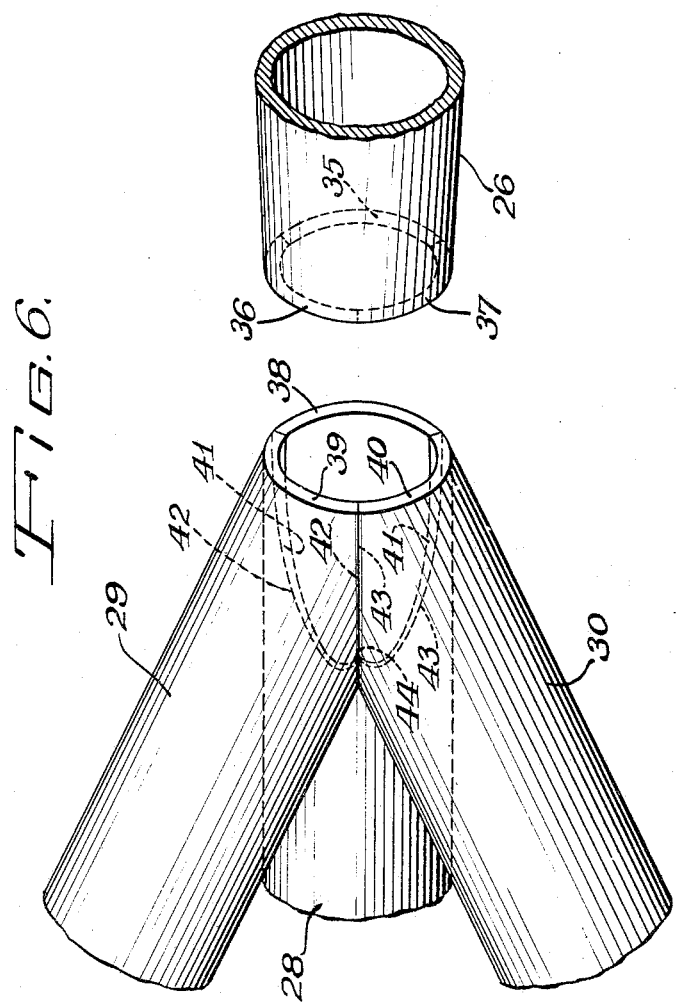
FIG. 6 is an exploded perspective, in slightly enlarged dimensions, showing fragmentarily the proposed manifold, but shown in a position rotated counterclockwise from the view of FIG. 3.

By referring to FIGS. 3, 4 and 6 of the drawings it will be seen that the circumferentially extending surface of the outlet end portion of the primary duct 26, in effect, provides substantially equally extending circumferential end wall portions, such as indicated at 35, 36 and 37 and corresponding in number to the number of secondary ducts, which terminates in circumferentially spaced terminals around said primary duct. It will be seen also that each of the secondary ducts or branch tubes 28, 29 and 30, as formed at the inlet end thereof, provides a circumferential end wall portion, such as is, respectively, indicated at 38, 39 and 40, that also terminates in circumferentially spaced terminals and which merges with and is circumferentially coextensive with a respective circumferential end wall portion of the outlet end of said primary duct when said primary and secondary ducts are juxtaposed into a unitary structure. In addition, the inlet end portion of each of said secondary ducts, as formed, provides circumferentially spaced circumferential side wall portions 41—41, 42—42 and 43—43 that converge onto one another from the terminals of their associated circumferential end wall portions with the inlet end edges of each of said converging side wall portion extending from the terminals of the circumferential end wall portions and radially of the primary duct to a point of convergence, indicated at 44, substantially coincident with the principal axis of the primary duct.

It will also be seen, by particular reference to FIGS. 3, 4 and 6 of the drawings, that the respective junction edges or converging side wall portions 41—41, 42—42 and 43—43 of the secondary ducts 28, 29 and 30 define straight lines extending in radial planes as they converge and meet at the common point 44, and that said edge portions also form or define a relatively sharp-edged fluid flow-dividing partition or baffle-like means, indicated generally by the reference numeral 45, which is shaped to generally resemble a letter Y that extends generally transversely across the path of fluid flow proximate the outlet end of the primary duct or common tube 26 and the inlet ends of the respective branch tubes 28, 29 and 30. This baffle-like flow-divider or partitioning means, being formed at the inlet end portions of the branch tubes or secondary ducts and along the junction edges thereof with each other, has outwardly diverging and downstream extending surface portions, formed by the walls of the respective secondary ducts or branches, that operate to cause the fluid flowing into said secondary ducts to diverge at equal angles with respect to the axis of fluid flow in the common tube or primary duct and, further, to divide the fluid flow equally among all the connected secondary branches.

The branches or ram-pipes 28, 29 and 30 are all of substantially equal length and volumetric capacity, and each one flairs or extends endwise outwardly from the end of the common tube portion 26 at the same angle with respect to the principal axis or path of fluid flow within said common tube. This angle is measured between the axis of fluid flow in the respective branch tube, at a point in close proximity to its junction with the common tube, and a projection when extended of the axis of fluid flow in the common tube which in this instance is horizontal, and is measured in the direction of flow within the common tube and away from the entrance of fluid thereinto. As seen in FIGS. 2 and 4, the axis of fluid flow within the common tube portion 26 is indicated as $w$—$w$, while the axis of fluid flow in the ram-pipe or branch 28 is $x$—$x$, in branch 29 is $y$—$y$, and in branch 30 is $z$—$z$. Since said branch tubes all flair or diverge outwardly from the common tube 26 at substantially the same angle, the angles referenced with the letters $a$, $b$, and $c$ in FIGS. 2 and 4 should be substantially equal. It has been found that in order to minimize the objectionable effects of pulsing in the proposed manifold or duct system and thereby obtain optimum results, the angles $a$, $b$, and $c$, preferably, should each form an acute angle and, furthermore, each such angle should be maintained within limits approximating a minimum of 20° and a maximum of 60° in order to attain the aforesaid desirable objectives. As seen from FIGS. 2, 4 and 6 of the drawings, it will be noted that the branch tubes 28, 29 and 30 are so arranged that each branch together with one other branch and the common tube form substantially a letter Y with the common tube providing the stem for said letter.

The angular displacements between the respective branches or ram pipes, indicated by the angles marked with the reference characters $d$, $e$ and $f$ (FIGS. 3 and 5), for ideal operation will generally be equalized, although it is believed variations therein may be permitted, to accommodate the positioning of certain engine components or the like, without materially deviating from the teachings or inventive concepts of the present invention. The exact amount of such deviation that may be tolerated without materially affecting operating results is not, at this time, known; but it is believed that so long as the equalization of distribution of fluid flow to each of the branches is maintained, the amount of deviation is immaterial. Only when such deviation operates to cause unequal flow of charging mixture to the various branches or secondary ducts does the amount of these angular displacements become important. It is believed that so long as the effective impingement areas, i.e. the wall areas of each of the respective branch tubes or secondary ducts disposed in axial alignment with the path of fluid flow in said common tube or primary duct, are substantially equal, or the circumferential end wall portions 35, 36 and 37 of the meeting surfaces are substantially equal to one another, or further, if the circumferential side wall portions 41—41, 42—42, and 43—43 are substantially equal to one another the fuel mixture will be equally distributed from the primary duct or common tube to each of its associated branch tubes or ram-pipes. In the present instance, since three branch pipes or secondary ducts are provided, the angular displacement between the respective branches would, ordinarily, be in the order of 120°.

It will be appreciated, of course, that the particular length and diameter for each of the individual branch pipes will be sufficient not only to produce the desired ram effect therein as is well understood, but also to accommodate a supply of the fuel charge to each of the cylinders that will be substantially equal during the charging cycle, and, further, that these dimensions will, at the same time, also be selected and tailored to fit all the requirements of the particular engine with which the manifold or duct system is to be employed. Likewise, the configuration or contours of the curves of the individual branch pipes may be modified or adjusted to suit particular conditions, such as may be dictated by space limitations and the like, providing, of course, that the angles $a$, $b$ and $c$ are always maintained substantially equal and within the prescribed limits heretofore enumerated, and, further, that any curves therein are fashioned with a radius of curvature such as will provide a smooth flow without a sharp or abrupt change of direction of fluid flow through said branch pipes. As presently depicted in the drawings hereof the proposed induction system is also readily adaptable for installation under conventional "hood sheet" lines of modern vehicles, power units, stationary engines and the like.

In FIGS. 7–10 there is shown a slightly modified version of the present invention which is adaptable for application or use with an engine having a conventional Down-Draft type of carburetor. In this latter adaptation the same reference numerals are used to indicate elements similar to those heretofore described, while modified elements are indicated with the same previously applied reference numeral plus the addition of the suffix "$a$" thereto. The carburetor, shown only fragmentarily and indicated generally by the reference numeral 22$a$, being of a conventional and well known "Down-Draft" type, is adapted for connection on the inlet side thereof to a fuel charge inlet (not shown), as is well understood, while a mounting flange 23 on the outlet of the carburetor abuts and is connected to a mounting flange 24 on the manifold 21$a$ by suitable bolts such as 25. The modified manifold 21$a$ comprises a common tube or header-like inlet conduit portion 26, as before, with a flange 24 affixed to the inlet end thereof, and a plurality of branch tubes or ram-pipes 28$a$, 29$a$ and 30$a$ connected to and extending from the outlet end of the manifold, and having mounting flanges 31, 32 and 33 on the opposite ends of said branches adaptable for connection to inlet ports, such as the "Siamese" ports shown at 34, in the engine or cylinder head 12, while suitable securing means, such as the bolts 19, may be used for securely attaching said mounting flanges to said cylinder head. As previously described for the first preferred form hereof, all of the branches 28$a$, 29$a$ and 30$a$ are of equal length and volumetric capacity and each one extends or diverges outwardly from the end of the common tube at substantially the same acute angle relative to a projection of the axis of the path of fluid flow therein. However, the principal axis or the axis of fluid flow within the common tube portion 26 in this instance will be vertical and is indicated, as before, by the letters *w—w*, while the axis of flow in the branch 28*a* is a *x—x*, in branch 29*a* is *y—y*, and in branch 30*a* is *z—z*. The respective angles between these axes are indicated, as before, by the letters, *a*, *b* and *c*, and again the branches are so arranged that each branch together with one other branch and the common tube form substantially a letter Y with the common tube providing the stem for said letter. Likewise, as before, the end edges of said branches define a flow-divider indicated at 45*a* in FIGURE 8.

As was the case in the first preferred form heretofore described, the angular displacements between the respective branches 28*a*, 29*a* and 30*a*, again indicated by the reference characters *d*, *e* and *f*, are generally equalized although variations therein may be provided, as heretofore mentioned, to accommodate the locating of certain engine components or the like without deviating from the inventive concepts of the invention. With the three branch pipes 28*a*, 29*a* and 30*a* illustrated herein this displacement will, of course, be generally of the order of 120°.

*Operation*

In the operation of an engine equipped with the proposed invention, the charging fuel mixture is delivered from the throttling device, indicated generally by the carburetor at 22, into the primary duct header-like common tube or inlet conduit portion 26 from whence it is directed at the opposite end thereof by the flow-dividing means 45 substantially equally into each of the attached secondary ducts or branch tubes. During this movement of the fuel charge or mixture through the manifold or duct system a portion of said charge appears to impinge directly upon the effective impingement wall area of each branch tube, i.e. the projected wall area of a respective branch tube disposed in axial alignment with the path of fluid flow in the common tube portion, while the remainder of the charging mixture is carried by the momentum of the flowing stream of the charge directly into the respective branch tubes without impinging on the walls thereof. Usually, it is believed, the heavier droplets of the charge form that portion of the charge that will impinge against the respective effective impingement area, while the lighter droplets portion thereof will pass into the respective branch tube without impinging against the impingement area of the wall thereof. Since each of the secondary ducts or branch pipes, as illustrated herein, is connected with a "Siamese" port that, in turn, connects with two cylinders, the charge in each branch upon reaching the respective inlet port is again divided into two equal streams one of which goes to each of the associated cylinders as required by the pulsing thereof as is well known. As thus arranged, in the present instance, the original single stream of charging fuel coming from the throttling device or carburetor may ultimately be divided, into a plurality of separate and equal streams so that each engine cylinder is thus provided with an identical fuel charge thereby obtaining maximum performance and economy of operation for the engine, while this equalizing of the charge, when utilized in conjunction with the ram effect or dynamic tuning feature of the proposed manifold, functions to produce the much desired increase in power in the associated engine.

The proposed manifold when employed with a naturally aspirated internal combustion engine is believed to be equally effective regardless of whether the engine is equipped to use either fuel injection or a carburetor device. In order to use this manifold or duct system with the fuel injection system of an engine, the carburetor throttling device is replaced by an air throttling device of conventional and well known construction; and a fuel injection nozzle is installed at any point in each branch pipe, such as indicated by the broken lines at 46 in FIGS. 2 and 7. If preferred, however, said injection nozzles may be installed, instead, in each cylinder head in the vicinity of each of the inlet ports thereof, or a nozzle or nozzles may be installed in the common header tube 26, as is well understood.

The manner of achieving the objects and features enumerated is believed to be clear from the foregoing detailed construction. Other objects and features will undoubtedly occur to those skilled in the art. Likewise, certain modifications and alterations in the preferred construction disclosed may occur, all of which may be made without departing from the spirit and scope of the invention as set forth in the appended claims.

What is claimed is:

1. In an induction system for a multi-cylinder engine having a plurality of inlet port openings therein, an intake manifold, comprising: a horizontally disposed inlet conduit having one end thereof open and adapted for connection to a carburetor; a plurality of ram-pipes connected in endwise relation into the opposite end of said inlet conduit, the said opposite end of said inlet conduit being fashioned to provide the same interior diameter as each of said ram-pipes proximate the connection of said conduit therewith, said ram-pipes being each of substantially the same length and volumetric capacity and adapted for connection to an inlet port opening of the engine, said ram-pipes extending outwardly from said inlet conduit and being disposed so that all of said ram-pipes diverge therefrom at substantially equal angles with each such angle being not more than 60° nor less than 20° as measured to the projected axis of fluid flow in said inlet conduit when the axis is extended in a direction away from the open end of said conduit.

2. In an induction system for a multi-cylinder engine having a plurality of inlet port openings therein, an intake manifold, comprising: an inlet conduit having one end thereof open and adapted for connection to throttling means; a plurality of ram-pipes each being of substantially the same length and volumetric capacity extending endwise outwardly from the opposite end of said inlet conduit and adapted for connection to a respective inlet port opening in the engine; flow dividing means disposed proximate the end opposite said open end of said inlet conduit for directing fluid flow from said inlet conduit equally into each of said plurality of ram-pipes; said flow dividing means including a generally Y-shaped partitioning means defined by the adjoining end edges of said ram-pipes at the junctions thereof with each other, and having the intersecting center point of said Y disposed in axial alignment with the principal axis of said inlet conduit.

3. In an induction system for a multi-cylinder engine having a plurality of inlet port openings therein, an intake manifold, comprising: an inlet conduit having one end thereof open and adapted for connection to throttling means; a plurality of ram-pipes each being of substantially the same length and volumetric capacity connected to and extending endwise outwardly from the opposite end of said inlet conduit and adapted for connection to a respective inlet port opening in the engine; and partitioning means defined by the adjoining end edges of said ram-pipes at the junction thereof with each other and disposed in the path of fluid flow therein with the center of said means disposed in axial alignment with the axis of fluid flow in said inlet conduit for directing fluid flow from said inlet conduit equally into each of said plurality of ram-pipes.

4. In an induction system for a multi-cylinder engine having a plurality of inlet port openings therein, an intake manifold, comprising: an inlet conduit having one end thereof open and adapted for connection to throttling means; a plurality of ram-pipes each being of substantially the same length and volumetric capacity connected to and extending endwise outwardly from the opposite end of said inlet conduit and adapted for connection to a respective inlet port opening in the engine; baffle means disposed within said ram-pipes proximate the end opposite said open end of said inlet conduit whereby fluid flowing through said inlet conduit is directed equally into each of said plurality of ram-pipes; said baffle means being generally Y-shaped and including radially extending arms defined by the adjoining end edges of said ram-pipes at the junctions thereof with each other; said baffle being further fashioned so that the side surfaces thereof diverge outwardly at substantially equal angles from said inlet conduit portion and each such angle of which is less than 90° to the projected axis of fluid flow in said inlet conduit portion as measured when the axis is extended in a direction away from the inlet thereof.

5. A duct system, comprising: a primary duct having an outlet end portion and a plurality of at least three secondary ducts having inlet end portions communicating with such outlet end portion and with each such secondary duct leading endwise from the primary duct at an angle of not more than 60° or less than 20° when measured to a projected axis of the primary duct when said axis is extended in a direction away from the outlet end of said primary duct, the primary duct having circumferential end wall portions each of substantially equal circumferential extent at its outlet end portion equal in number to the secondary ducts, each said circumferential end wall portion having circumferentially spaced terminals, the inlet duct end portions having respective circumferential end wall portions each of substantially equal circumferential extent and respectively merging with and circumferentially coextensive with the circumferential end wall portions of the primary duct, the inlet duct circumferential end wall portions also having circumferentially spaced terminals, and the inlet duct end portions each also having additional circumferential side wall portions converging onto one another from the terminals of their associated circumferential end wall portions and with inlet-end edges of each converging side wall portion extending from the terminals of the respective circumferential end wall portions and radially of the primary duct to a common point of convergence substantially coincident with an extension of the principal axis of the primary duct.

References Cited in the file of this patent

UNITED STATES PATENTS

| | | |
|---|---|---|
| 1,150,264 | Greer | Aug. 17, 1915 |
| 1,260,895 | Hall | Mar. 26, 1918 |
| 1,347,598 | Sturm | July 27, 1920 |
| 1,458,481 | Good | June 12, 1923 |
| 1,745,020 | Lawrence | Jan. 28, 1930 |
| 1,982,625 | Barker | Dec. 4, 1934 |
| 2,503,071 | Scherger | Apr. 4, 1950 |
| 2,730,339 | Presnell | Jan. 10, 1956 |

FOREIGN PATENTS

| | | |
|---|---|---|
| 696,549 | Great Britain | Sept. 2, 1953 |